No. 712,109. Patented Oct. 28, 1902.
W. WELCH.
APPARATUS FOR TRUING SPINNING RINGS.
(Application filed Dec. 2, 1901.)
(No Model.)
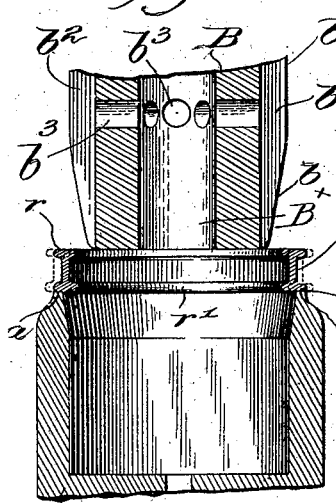
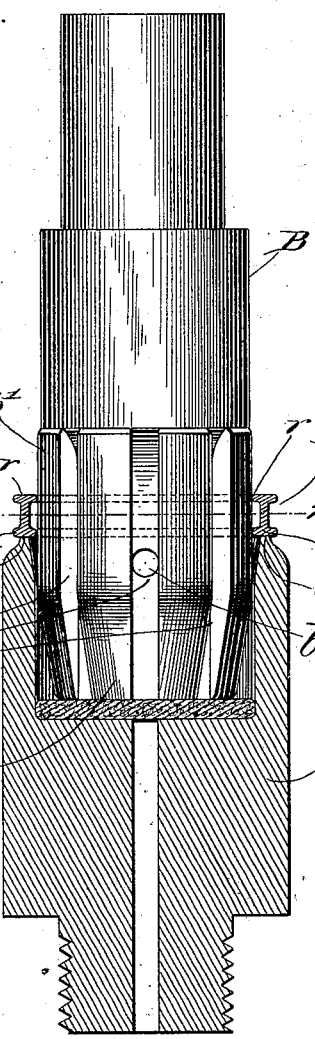
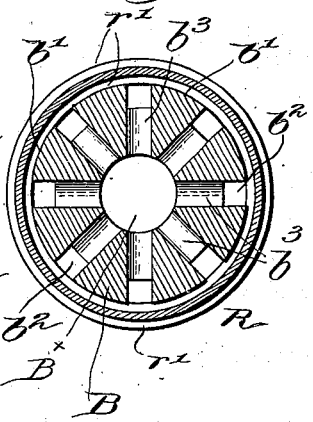
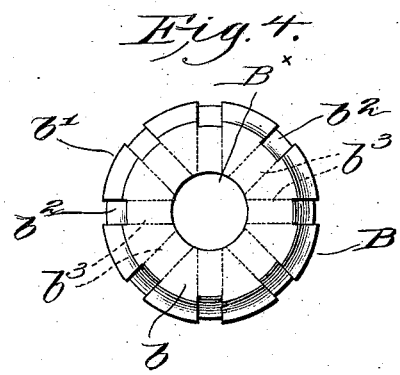
Witnesses.
Inventor:
William Welch.

UNITED STATES PATENT OFFICE.

WILLIAM WELCH, OF HOPEDALE, MASSACHUSETTS, ASSIGNOR TO DRAPER COMPANY, OF HOPEDALE, MASSACHUSETTS, A CORPORATION OF MAINE.

APPARATUS FOR TRUING SPINNING-RINGS.

SPECIFICATION forming part of Letters Patent No. 712,109, dated October 28, 1902.

Application filed December 2, 1901. Serial No. 84,309. (No model.)

*To all whom it may concern:*

Be it known that I, WILLIAM WELCH, a citizen of the United States, and a resident of Hopedale, county of Worcester, State of Massachusetts, have invented an Improvement in Apparatus for Truing Spinning-Rings, of which the following description, in connection with the accompanying drawings, is a specification, like letters on the drawings representing like parts.

This invention relates to the treatment of spinning-rings whereby they are trued to accurate internal diameter and circular curvature after being hardened; and it has for its object the production of an apparatus for truing rings whereby a relatively soft flange is obviated.

In United States Patent No. 606,675, dated July 5, 1898, the ring to be trued is heated, an arbor or form is driven therein having an external diameter greater than the internal diameter of the heated ring, thereby stretching the ring, and while the latter is stretched it is immersed in a cooling medium. The inner edges of the flanges tightly hug the arbor during the application of the cooling medium, preventing access of the latter to the inner faces of the web and flanges, and rings with soft flanges are at times produced.

By my present invention the cooling medium is directed to the inner faces of the web and flanges of the ring as well as to the exterior faces, so that a more thoroughly uniform action is effected and the ring is of substantially uniform hardness throughout.

Figure 1 is a vertical sectional view in part of one form of apparatus embodying my invention, the arbor or form being shown in elevation. Fig. 2 is a transverse section thereof on the line 2 2, Fig. 1. Fig. 3 shows the manner of mechanically expanding the ring to the proper internal diameter and curvature, and Fig. 4 is an end view of the arbor or form.

As in the patent referred to, the ring after it has been hardened in any usual manner is heated to such a temperature as will admit of its stretching without rupture, and into the heated ring an arbor is forced, the arbor having a tapering end and an adjacent cylindrical portion having a diameter slightly larger than the internal diameter of the flanges of the heated ring. The ring is thereby gradually and slightly stretched to the desired internal diameter, and while the stretching is maintained a cooling medium is applied, preferably by immersion in water or other liquid, and in order that the second hardening thus imparted to the ring may be substantially uniform throughout I provide the cylindrical portion of the arbor with axially-arranged channels, which permit the ready entrance of the cooling medium to the annular chamber formed by the surface of the arbor and the inner faces of the web and flanges of the ring.

Referring to Fig. 1, the cup-shaped support A has its upper edge shaped to present an annular seat $a$, upon which the ring R after being heated is sustained, as in said patent, and while the ring is thus sustained an arbor or form B is forced into it. The end $b$ of the arbor is smaller than the internal diameter of the ring-flanges $r$ $r'$ and is tapered to a cylindrical portion $b'$, preferably slightly greater than the internal diameter of said flanges when the ring is heated, such portion $b'$ being accurately cylindrical and of the exact diameter it is desired the ring shall be interiorly. I have herein shown such portion $b'$ as provided with a series of axially-arranged channels or grooves $b^2$, which preferably extend along the tapered portion of the arbor, the channels preventing a continuous annular contact between the ring-flanges and the arbor when the latter is driven into the ring. As the arbor is pushed into the heated ring the latter will be expanded from full-line diameter, Fig. 3, to dotted-line diameter when the portion $b'$ of the arbor enters the ring. The arbor, with the expanded ring upon it, is then withdrawn from the ring-support A and preferably plunged into water or other cooling medium, the latter instantly entering by way of the channels $b^2$ to the annular chamber formed by the flanges and web of the ring and the cylindrical wall of the arbor. By this means the cooling medium contacts directly with the inner faces of the web and flanges as well as with their outer faces, so that the entire surface of the ring is subjected to the direct cooling action, with the exception of those portions of the inner edges of the flanges which contact with the cylindrical surface of the arbor between the channels. As a result the ring is cooled and hardened with substantial uniformity throughout, obviating any internal strains due to unequal cooling and preventing soft flanges.

When the ring is cooled, it is separated from the arbor in any suitable manner, as by a slight hammer tap.

The edge sections of the flanges in contact with the arbor during cooling present such a very small fraction of the entire surface of the ring and are so immediately adjacent large portions of the surface in direct contact with the cooling medium that they present no obstacle whatever to the uniform cooling and hardening of the ring.

In order to keep the temperature of the arbor low during the operation, I have shown a central opening or bore $B^\times$ extended longitudinally through the arbor and communicating with the channels $b^2$ by transverse ducts or holes $b^3$, whereby the cooling medium can circulate through and act upon the interior of the arbor, maintaining it cool and facilitating the proper treatment of the ring.

Having fully described my invention, what I claim as new, and desire to secure by Letters Patent, is—

1. In apparatus for truing spinning-rings, an annular support to sustain the ring beneath its web, and an arbor or form having a tapering end and adjacent cylindrical portion of the diameter desired for the interior of the ring, the arbor having a series of axially-arranged channels to permit the access of a cooling medium to the interior faces of the web and flanges of a ring when stretched upon the cylindrical portion of the arbor, the latter presenting a series of segmental faces equal in length to the cylindrical portion of the arbor.

2. In apparatus for truing spinning-rings, an annular support to sustain the ring, and an arbor having a tapered end and an adjacent cylindrical portion of the diameter desired for the interior of the ring, a longitudinal opening through the arbor, axially-arranged channels upon the exterior of the latter, to permit access of a cooling medium to the interior faces of the web and flanges of a ring when stretched upon the cylindrical portion of the arbor, and ducts connecting the channels and the longitudinal opening of the arbor, for the circulation of the cooling medium therethrough.

3. An arbor for truing spinning-rings, having a central bore, said arbor having a tapered end and an adjacent cylindrical portion, axially-arranged channels upon the exterior of the arbor, and circulation-ducts connecting the channels with the bore of the arbor.

In testimony whereof I have signed my name to this specification in the presence of two subscribing witnesses.

WILLIAM WELCH.

Witnesses:
   GEORGE OTIS DRAPER,
   ERNEST W. WOOD.